United States Patent
Oda et al.

[11] Patent Number: 5,969,746
[45] Date of Patent: Oct. 19, 1999

[54] IMAGE FORMING APPARATUS FOR REPRODUCING HALFTONE IMAGES

[75] Inventors: Yasuhiro Oda; Kazuhiko Arai; Yuichi Fukuda; Nobuhiro Katsuta; Masanori Kobayashi, all of Nakai-machi, Japan

[73] Assignee: Fuji Xerox Co., LTD., Tokyo, Japan

[21] Appl. No.: 08/766,344

[22] Filed: Dec. 16, 1996

[30] Foreign Application Priority Data

Dec. 18, 1995 [JP] Japan .................................. 7-329159

[51] Int. Cl.⁶ ...................................................... H04N 1/21
[52] U.S. Cl. .......................... 347/252; 347/251; 347/254; 347/131; 347/140
[58] Field of Search .................................. 347/131, 251, 347/252, 254, 240, 155, 156, 154; 430/71; 399/314

[56] References Cited

U.S. PATENT DOCUMENTS

| | | | |
|---|---|---|---|
| 5,327,339 | 7/1994 | Takeda et al. | 347/131 |
| 5,453,773 | 9/1995 | Hattori et al. | 347/131 |
| 5,633,669 | 5/1997 | Hada et al. | 347/131 |

FOREIGN PATENT DOCUMENTS

| | | |
|---|---|---|
| B 46-41679 | 12/1971 | Japan . |
| A 51-94939 | 1/1976 | Japan . |
| A 59-125765 | 7/1984 | Japan . |
| A 4-264476 | 9/1992 | Japan . |
| A 6-11977 | 1/1994 | Japan . |

Primary Examiner—N. Le
Assistant Examiner—Hai C. Pham
Attorney, Agent, or Firm—Oliff & Berridge, PLC

[57] ABSTRACT

An image forming apparatus for reproducing an image corresponding to a digitized image signal includes; an imaging member; a halftone image forming device for reproducing a latent image composed of a plurality of pixels on the imaging member, and for developing the latent image so that coloring particles are adhered in each pixel being put together as an island, the halftone image including a relatively low density halftone image; and a transfixing device for simultaneously transferring the halftone image and fixing the halftone image onto a recording sheet. The image forming apparatus may further includes an intermediate transfer medium. The island-like toner image reproduces the halftone image clearly.

9 Claims, 15 Drawing Sheets

IMAGE FORMING APPARATUS FOR REPRODUCING HALFTONE IMAGES

BACKGROUND OF THE INVENTION

This invention relates to an image forming apparatus. More specifically, this invention relates to an image forming apparatus for forming toner images onto a surface of a photoreceptor and transfixing the toner image onto a recording sheet.

Recently, image forming apparatus using digital electrophotographic imaging processes have been variously used for printers and copiers. The processes comprise forming of electrostatic latent image onto a surface of a photoreceptor by an irradiating light beam carrying image information corresponding to characters and images. In such digital image forming apparatus, a method for reproducing halftone images as well as solid images for forming an electrostatic latent image having a halftone-dot structure or a line-screen structure by rapidly switching a light beam between an on state and an off state has also been known and utilized for digital electrophotographic type copiers or printers. Algorithm for the method is easily realized at good cost performance.

Such image forming apparatuses comprise the steps of forming an electrostatic latent image on a photoreceptor, developing the electrostatic latent image by a dry toner for forming a toner image transferring the toner image onto a recording sheet and fusing the toner image. There are some drawbacks such as an unevenness of the density of the toner image or a low reproducibility of the halftone dots of the toner image or a low resolution of the toner image due to toner scattering during the toner transferring step.

Those drawbacks are mainly caused by the process of transferring the toner image using electrostatic phenomena of the toner particles. In other words, due to an irregular surface of the recording sheet, the surface of the photoreceptor and the surface of the recording sheet do not completely fit with each other and produce uneven gaps therebetween sufficient to cause a non-uniform electric transfer field or to induce coulomb inter-toner particles repulsive forces. Thus, image quality of the halftone images are degraded.

To avoid such drawbacks, Japanese Examined Patent Publication (JP-B) Sho. 46-41697 discloses a method for transferring a toner image visco-elastically onto a surface of an intermediate transfer medium, then re-transferring the toner image thermally from the surface of the intermediate transfer medium to a surface of an image recording sheet by melting the toner images. In this method, such degradation of the toner image does not tend to occur because the process of transferring the toner image is done through a non-electrostatic way.

Japanese Unexamined Patent Publication (JP-A) 51-94939 discloses a technique for obtaining a color image by transferring plural toner images, each having a unique hue, formed on a surface of a photoreceptor to a surface of an intermediate transfer medium such that they overlap each other, melting those toner images on the surface of the intermediate transfer medium and transferring the melted toner images onto a recording medium. In this method, such degradation of the toner image does not tend to occur because the transferring of the toner images is also done through a non-electrostatic way. Such methods for carrying out the transferring process and the fusing process simultaneously is referred to as a 'Transfix' technique.

SUMMARY OF THE INVENTION

The object of the present invention is to provide an image forming apparatus capable of forming a totally high quality transferred toner image, varied from a low density image (i.e. a highlight image) to a high density image (i.e. a solid image).

Another object of the present invention is to provide an image forming apparatus for reproducing an image corresponding to a digitized image signal comprising: an imaging member; a halftone image forming device for reproducing a latent image composed of a plurality of pixels on the imaging member, and for developing the latent image so that coloring particles are adhered in each pixel being put together as an island, the halftone image including a relatively low density halftone image; and a transfixing device for simultaneously transferring the halftone image and fixing the halftone image onto a recording sheet.

DETAILED DESCRIPTION OF PREFERRED EMBODIMENTS

Figure 1A:
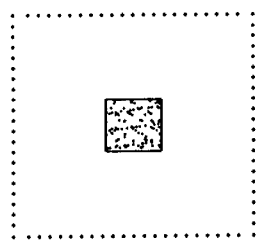
FIGS. 1(a) through (g) are explanatory views of the definition of 'visible toner image wherein toner particles are collectively formed like an isolated island'.
Figure 1B:
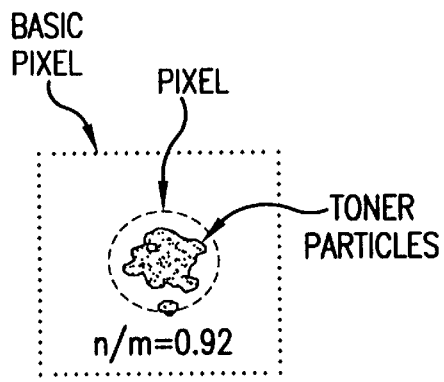
Figure 1C:
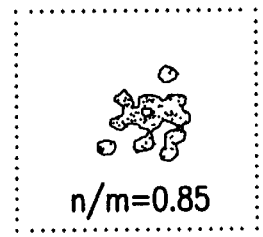
Figure 1D:
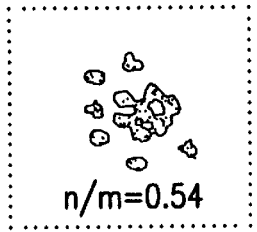
Figure 1E:
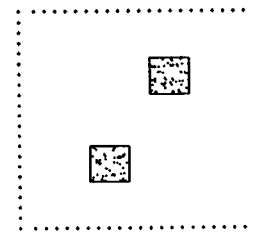
Figure 1F:
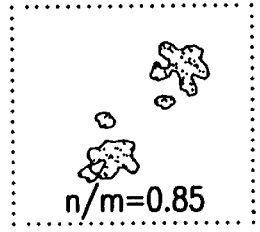
Figure 1G:
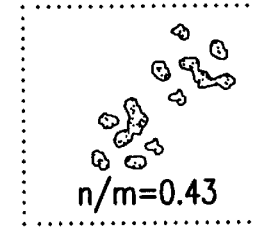

When the 'transfix' technique is applied to an image forming apparatus that treats an image as digitized signals and forms a halftone image by an area modulating method using halftone dots or line screens, it has been discovered that the image defects in the halftone image due to the aforementioned scattering of toner particles or coulomb repulsive force between toner particles seem to be controlled to a low level in medium-to high image density area; however, the transfixed rate of the toner particles in a relatively low image density area (highlight area) is still relatively low. In other words, toner particles in relatively low image density areas still seem to not be transferred sufficiently onto a surface of the recording medium and the image defects of the halftone image in low image density areas is not improved or is worsened as compared to the ordinal technique using electrostatic transfer technique.

In addition, when energy to be used to transfix the toner image is increased in order to improve image quality and transfixed rate of toner particles, it has also been discovered that the transfixing rate of the toner image tends to be better in low image density area (highlight area); however, as a trade-off, a background defect called 'background fog' in an entire image area occurs. In high image density areas having a large amount of toner, uneven fixing marks or uneven gloss marks have occurred due to excessive fusing of toner.

In a mid to high density area of the halftone image, since the toned area ratio of each pixel is relatively high, toner particles adhered to each pixel are transferred collectively onto a surface of an intermediate transfer medium or a recording sheet. However, in a low image density area of the halftone image, since the toned area ratio of each pixel is relatively low, toner particles tend to be placed being isolated from each other in a pixel. The isolated toner particles decrease an opportunity to contact accurately to the surface of the intermediate transfer medium or the recording sheet. Thus, the transferring efficiency of the toner particles in a low image density area decreases. If, even in such a relatively low image density area, each toner particle in a pixel is deposited as being put together rather than being scattered, the transferring efficiency might be increased providing that the total number of the toner particles to be adhered thereto is a constant.

The image forming apparatus of the present invention comprises an imaging member; a halftone image forming device for reproducing a latent image composed of a plurality of pixels on the imaging member, and for developing the latent image so that coloring particles are adhered in each pixel being put together as an island, the halftone image including a relatively low density halftone image and; a transfixing device for simultaneously transferring and fixing the halftone image onto a recording sheet.

The image forming apparatus may further include an intermediate transfer medium. The intermediate transfer medium preferably comprises a base layer and a surface layer. More preferably, the base layer has a volume resistivity from $10^7$ to $10^{15}$ $\Omega$cm and the surface layer has a surface resistivity form $10^8$ to $10^{16}$ $\Omega$/square. The intermediate transfer medium is constituted so as to form two transferring nips, which are a first transferring nip formed between the imaging member and the intermediate transfer medium and a second transferring nip formed between the intermediate transfer medium and a recording sheet.

The coloring particles may be toner particles. The coloring particles are adhered on each pixel so that the value m and n satisfy the following equation;

$$0.8 \leq n/m \leq 1.0$$

wherein, n is a total number of coloring particles adhered in one pixel and m is a total number of coloring particles being put together in the pixel when the halftone image is reproduced by the plural pixels, each of which is occupied by the coloring materials in 10 percent area ratio. Assuming that a latent image is formed by two kinds of pixels in which the toner particles will be adhered and will not be adhered as typical halftone-dot image or line-screen image, and the pixel in which the toner particles are adhered is configured so that the toner particles are adhered only on an area occupying 10% area ratio of the pixel (i.e. typically an exposed portion on a photoreceptor exposed by a pulse width modulated laser beam having 10% width to the pixel width), if the values n and m satisfy the above equation, the pixel is defined as the pixel represented by plural toner particles being put together like an island in a sea of each pixel area. More preferably, the values n and m satisfy the following equation:

$$0.9 \leq n/m \leq 1.0$$

FIG. 1 shows an explanatory view of the 'visible image as an aggregated toner particles' like an island in a sea (i.e. toner particles being put together as defined above as $n/m \geq 0.8$). When the toned image pixel is configured by the aggregated toner particles as shown in FIG. 1(b) or (c), almost similar to the ideal pixel corresponding to 10% imaging signal as shown in FIG. 1(a), the pixel is determined as 'the pixel formed by aggregated toner particles'. Otherwise, when the toned image pixel is configured by the scattered toner particles (n/m<8) as shown in FIG. 1(d), the pixel is determined as 'the pixel formed by non-aggregated toner particles'. As shown in FIG. 1(e), the ideal pixel may be configured by two separated areas to be toned by toner particles which are totally corresponding to 10% imaging signal. In this case, when the toned image pixel is configured by two islands of aggregated toner particles ($n/m \geq 0.8$) as shown in FIG. 1(f), the pixel is also determined as 'the pixel formed by aggregated toner particles'. Otherwise, when the toned image pixel is configured by the scattered toner particles (n/m<8) as shown in FIG. 1(g), the pixel is determined as 'the pixel formed by non-aggregated toner particles'.

In order to produce such halftone images constituted by the pixels formed by aggregated toner particles, an electrophotographic apparatus comprising a photoreceptor, an electrostatic latent image forming device and a developing device using toner particles may be preferably used. The electrostatic latent image forming device is preferably a raster outputting device for scanning a light beam in a fast-scan direction perpendicular to the moving direction of the photoreceptor (i.e. slow-scan direction). If the arranged pitch of pixels DBh in a fast scan direction of the light beam and diameter Dsh of the spot of the light beam on the surface of the photoreceptor satisfy the following equation, then 'the pixel formed by aggregated toner particles' may be preferably reproduced on the photoreceptor.

$$DBh/Dsh \leq 0.4$$

The arranged pitch of pixels of a halftone image in a fast-scan direction is defined as the repeated pitch of the surface potential in the fast-scan direction when the latent image is formed on the surface of the photoreceptor. The beam diameter on the surface of the photoreceptor is defined as $1/e^2$ spot diameter (i.e. diameter at $1/e^2$ (i.e. 13.5%) intensity of the maximum intensity of the beam energy distribution.).

The value of DBh/Dsh may exceed 0.4 if the specific photoreceptor having a characteristic that the charge decaying curve thereof has an inflection point corresponding to an intensity of the incident light beam. In other words, the photoreceptor has a heterogeneous charge decaying profile to exposing energy of the laser beam favorable to relatively low exposing energy. In this case, the value DBh/Dsh may be more than 0.4 and preferably not more than 0.6.

Such a photoreceptor may be configured as a function-separated type photoreceptor having a charge generating layer and a dual charge transporting layer consisting of a heterogeneous charge transporting layer and a homogeneous charge transporting layer. The heterogeneous charge transporting layer may be formed by dispersing charge transporting domains in an electrically inert matrix and the homogeneous charge transporting layer may be a charge transporting matrix.

When the image forming apparatus includes an intermediate transfer drum, the drum serves the purpose of receiving plural toner images from the photoconductive drum at a first transfer position and transfixing the toner images to a recording sheet at a second transfer position.

Specific embodiments of the present invention will be explained in detail by referring to the figures.

Figure 2:
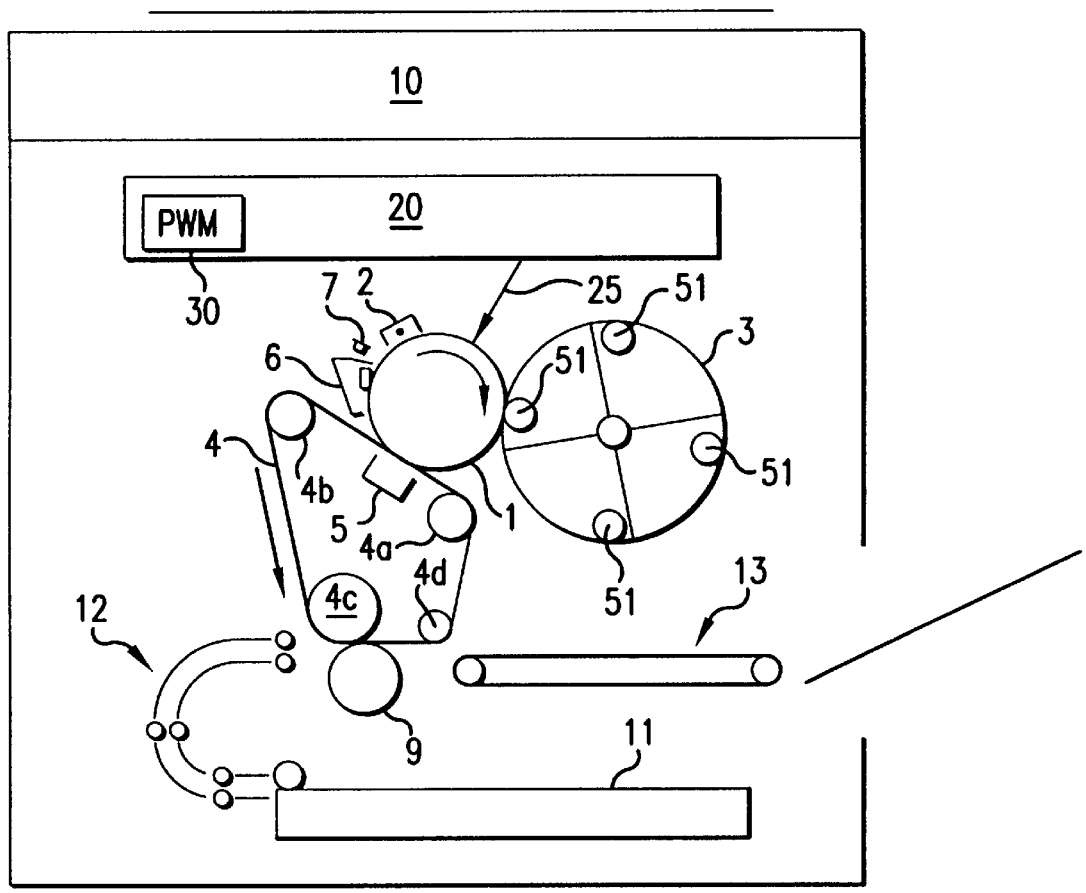
FIG. 2 is a schematic view of the color copying machine utilizing the first embodiment of the present invention.

FIG. 2 is a schematic view of the first embodiment of the color copying machine of the present invention. The original document is set downwardly on the upper surface of the document reading portion 10 and images on the original document are read by the document reading portion 10 photoelectrically to generate image signals.

The light beam scanning portion 20 generates an on-off modulated laser light beam, which has been modulated by the pulse width modulating circuit 30 in accordance with the generated image signals, and the light beam scans the surface of the photoconductive drum 1 repeatedly in a fast-scan direction that is perpendicular to the rotating direction of the photoreceptor (i.e. slow-scan direction).

The surface of the photoconductive drum 1 is charged uniformly by the charger 2. The surface of the photoconductive drum 1 is exposed by the laser light beam 25 so as to form an electrostatic latent image thereon. The electrostatic latent image formed on the surface of the photoconductive drum 1 moves to the developing portion adjacent the rotary-type developing apparatus 3. The rotary-type developing apparatus 3 is constituted by four independent developing devices each of which has yellow toner, cyan toner, magenta toner and black toner, respectively. Each developing device utilizes a reverse developing system using a two-component magnetic-brush developing system. The average diameter of toner particles is about 7 μm. The rotary-type developing apparatus rotates each time for developing respective electrostatic images corresponding to each toner color for forming an appropriate toned image. Bias voltage is applied to the developing roller 51 during the actual developing process in order to prevent toner adhering onto background areas of the electrostatic latent image.

The belt-like intermediate transfer medium 4 to which each colored toner image formed on the surface of the photoconductive drum 1 is transferred in sequence is positioned under the photoconductive drum so as to be inserted between the photoconductive drum 1 and the transfer charger 5. The intermediate transfer medium 4 is extended among the tension roller 4a, the driving roller 4b, the fusing roller 4c and the detaching roller 4d so as to rotate the medium in the arrow direction. The tension roller 4a applies an appropriate tension force to the medium, and the driving roller 4b applies driving force to the medium. The backup roller 9 is positioned adjacent the fusing roller 4c so as to put the medium therebetween. The fusing roller 4c and the backup roller 9 are positioned at the top and bottom of the intermediate transfer medium 4, respectively, so as to transfix the toner image from the surface of the intermediate transfer medium 4 onto the recording medium (not shown) that will be inserted between the intermediate transfer medium 4 and the backup roller 9 by applying pressure energy and heating energy thereto.

Toner images obtained by developing the electrostatic latent image formed on the surface of the photoconductive drum 1 reach the first transfer position adjacent the intermediate transfer medium 4 by rotating the photoconductive drum 1. The toner image is electrostatically transferred onto the intermediate transfer medium 4 by operating the transfer charger 5. The surface of the photoconductive drum is then cleaned by the cleaner 6 to remove residual toner particles therefrom, exposed by the pre-exposure 7 to erase residual potential thereon and charged again by the charger 2 for a succeeding image forming process.

The intermediate transfer medium 4 rotates repeatedly carrying transferred toner images while each toner image of yellow, cyan, magenta and black is formed in sequence on the photoconductive drum 1 and each toner image is transported to the first transfer position and transferred onto the surface of the intermediate transfer medium 4 in sequence so that all toner images overlap each other correctly in terms of image registration.

While the intermediate transfer medium 4 rotates continuously carrying transferred toner images, the backup roller 9 is kept away from the surface of the intermediate transfer medium so as not to interfere with toner images on the intermediate transfer medium and is shifted to a contacting position to the surface of the intermediate transfer medium 4 in the succeeding transfix stage. The length of the outer circumference of the intermediate transfer medium 4 is set to be larger than the length of the recording sheet for providing non imaging areas where any toner images are not transferred on the intermediate transfer medium 4. The backup roller 9 is primarily controlled in timing to contact the non imaging areas on the intermediate transfer medium 4 at the transfix stage in order to prevent destruction of the unfixed toner image on the surface of the intermediate transfer medium.

After all toner images including yellow, cyan, magenta and black toner images are transferred onto the surface of the intermediate transfer medium 4, synchronized to the transportation timing of the four toner images to the second transfer position of the nip between the fusing roller 4c and the backup roller 9, a recording sheet (not shown) is transported into the secondary transfer position from the paper tray 11 via an appropriate paper transfer path 12. At the second transfer position, toner images and the recording sheet are adjusted to overlap each other and heat and pressure energy are applied thereto to transfer and fix toner images on the recording sheet simultaneously. After the toner image is cooled down, the recording sheet having fixed color toner image is detached from the surface of the intermediate transfer medium 4 by using the outer curvature of the detaching roller 4d and transported through the paper transporting path 13 to the outside of the copying machine.

The material of the intermediate transfer medium 4 should be selected so as to satisfy both required properties, which are: 1) electrostatic transfer property at the first transfer portion and 2) thermal transfer property at the second transfer portion. In other words, the intermediate transfer medium 4 preferably has an appropriate elasticity so as to provide uniform pressure and sufficient contacting area between the photoconductive drum and the intermediate transfer medium in order to transfer the toner image from the photoconductive drum without any scattering of toner particles. In addition, the material preferably has an appropriate surface resistivity and an appropriate volume resistivity.

The intermediate transfer medium 4 preferably has an appropriate thermal resistance, a thermal conductivity and a thermal stability so as to transfix the toner image entirely from the intermediate transfer medium 4 to the recording medium, and preferably has sufficient low surface energy on the surface so as to release the entire transfixed toner image from the intermediate transfer medium 4 at the second transfer portion. Structures of the intermediate transfer medium in comply with such properties will be explained in detail later.

Figure 3:
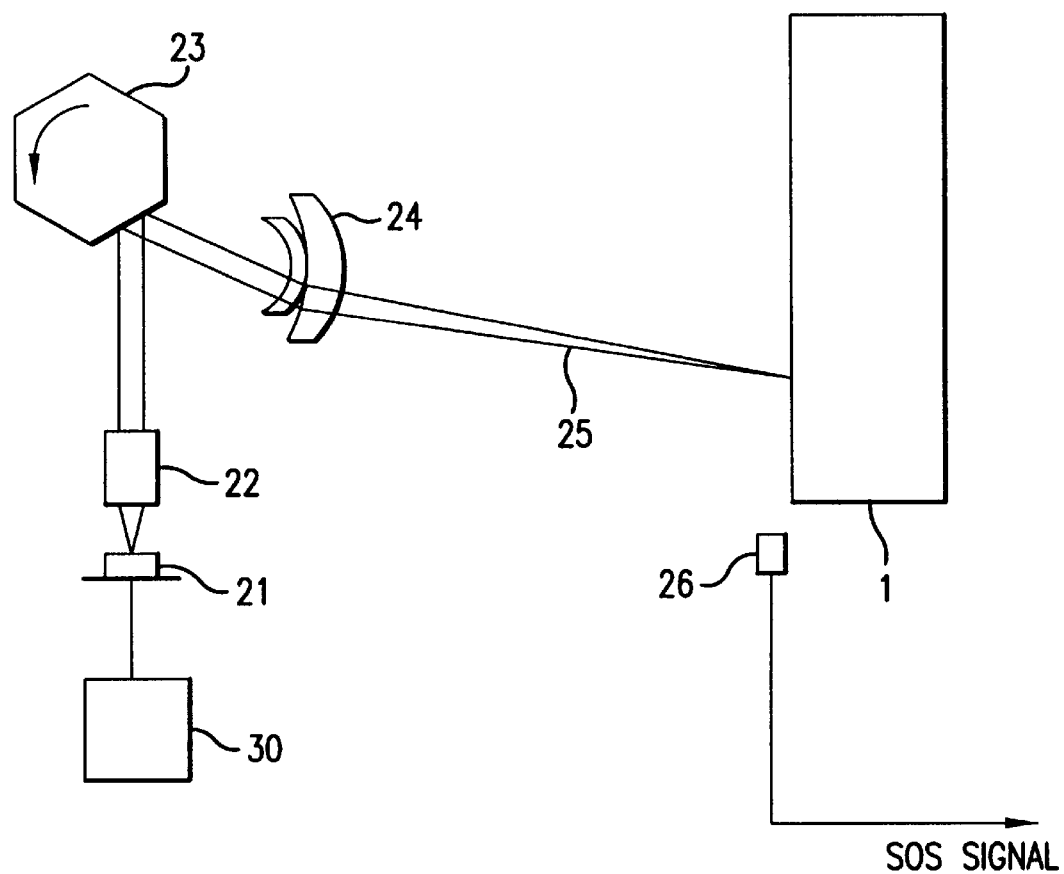
FIG. 3 is a schematic view of the raster output scanner.

FIG. 3 is a schematic view of the raster output scanner. An on-off laser beam modulated by the pulse width modulating circuit 30 is emitted from the semiconductive laser 21, then the beam is collimated by the collimator lens 22 and deflected repeatedly by the polygonal mirror 23 being rotated in the arrow direction. The deflected laser beam 25 scans the surface of the photoconductive drum 1 repeatedly in the fast-scan direction (i.e. up and down direction in FIG. 2) through the fθ lens 24, which controls the spot diameter of the laser beam on the photoconductive surface. The start timing of each scan of the laser beam in the fast-scan direction is detected by the photosensor 26 in order to generate start of scan (SOS) signals that will be incorporated as synchronizing signals of the rotation timing of the photoconductive drum 1 or the polygonal mirror 23.

Figure 4:
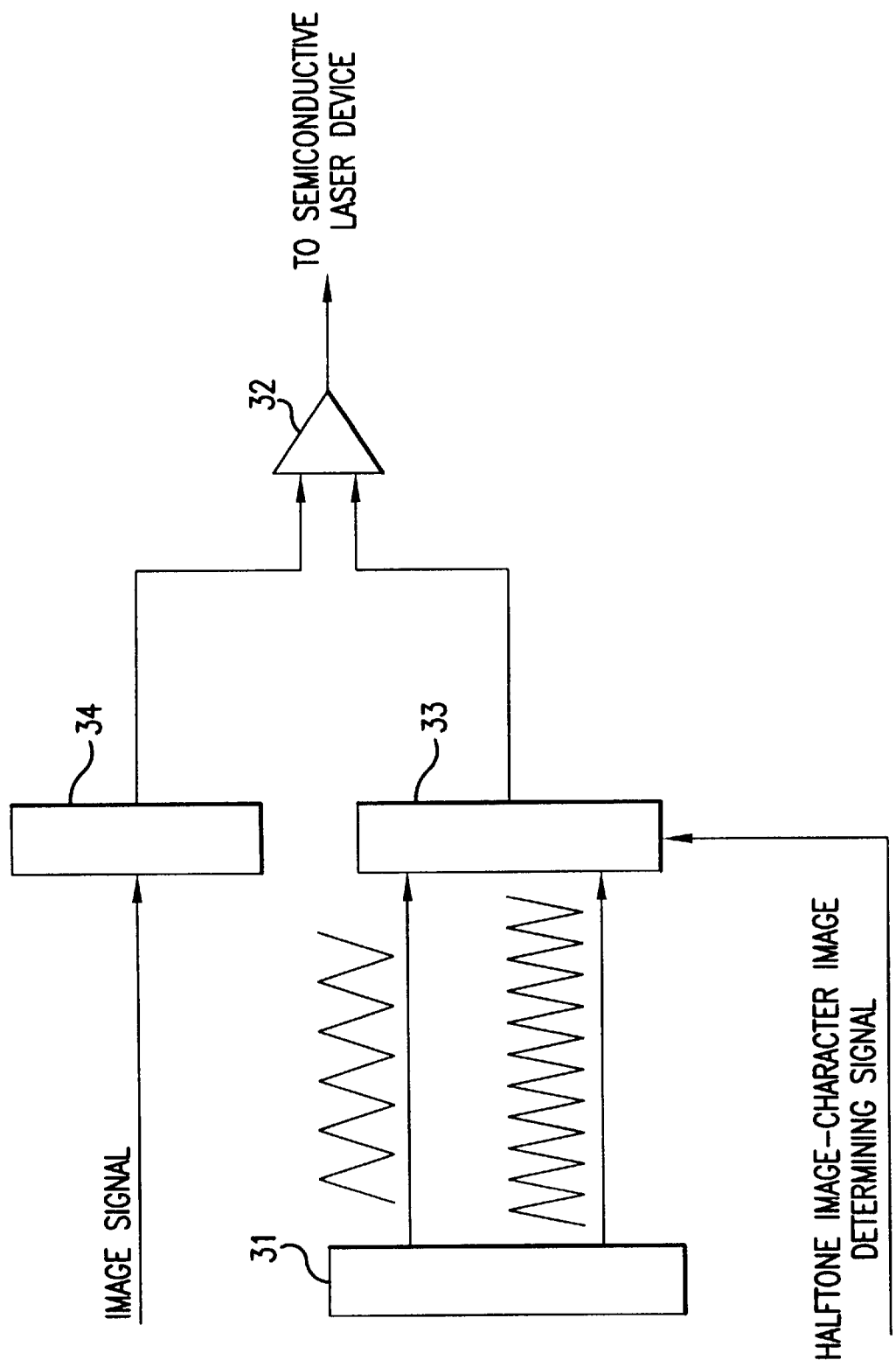
FIG. 4 is a block diagram of the pulse width modulating circuit for a light beam.

FIG. 4 is a block diagram of the pulse width modulating circuit. The chopping wave generator 31 generates two kinds of chopping waves having low frequency and high frequency, respectively, as indicated in FIG. 4 and inputs those chopping waves into the selector 33. The selector 33 selects the low-frequency chopping wave for a halftone image reproducing process and selects the high-frequency chopping wave for a character image reproducing process in response to a designating signal, and inputs the selected chopping wave into the comparator 32. The digitized image signal obtained by the image reading process at the image reading portion 10 is inputted into the digital-analogue (D/A) converter 34 to change the digitized signal into an analogue signal, which is inputted into the comparator 32. The comparator 32 compares the level of the inputted image signal and the level of the inputted chopping wave and outputs a binary pulse signal corresponding to the level of the analogue signal. The binary pulse signal is inputted into the semiconductive laser device 21 as indicated in FIG. 3 and the semiconductive laser device emits a modulated laser beam (i.e. alternating on and off state) corresponding to the binary pulse signal.

Figure 5:
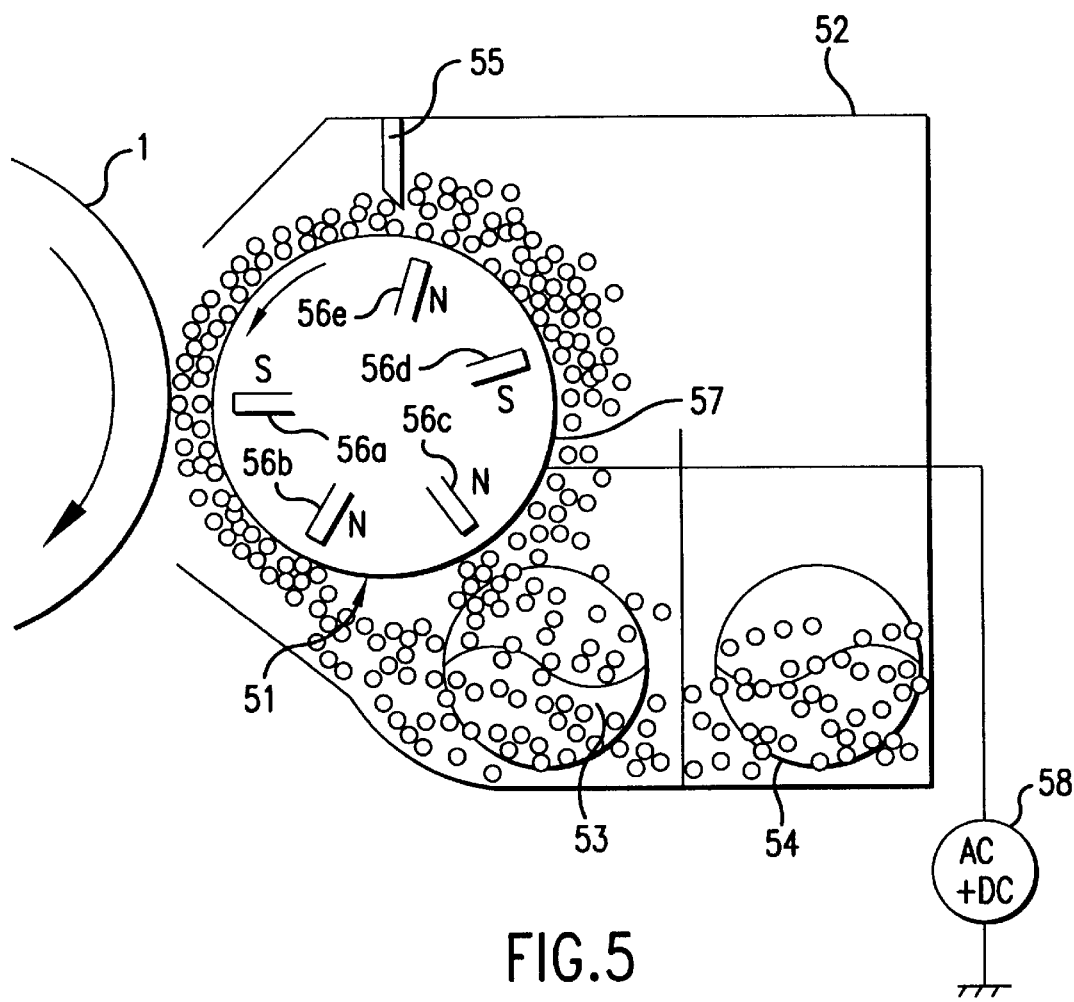
FIG. 5 is a structural view of one of the developing devices constituting the rotary developing apparatus as indicated in FIG. 2.

FIG. 5 is a structural view of one of the developing devices constituting the rotary developing apparatus 3 as indicated in FIG. 2. The developing device comprises a rotating hollow developing roller 51 for bearing and transporting a developer containing magnetic particles and toner particles, a metering blade 55 for restricting the total amount of developer to be transported on the surface of the developing roller 51, plural screw augers 53, 55 for mixing and transporting the developer in order to provide the developer onto the developing roller 51 and a housing 52, which constitutes an outer cover thereof, for containing the developer.

The developing roller 51 includes a rotatable sleeve 57 and a fixed magnetic roller installed therein. The sleeve 57 is installed adjacent the surface of the photoconductive drum 1, maintaining a 0.5 mm clearance therebetween. The developing process is performed at the adjacent portion. The fixed magnetic roller includes plural magnetic poles 56a, 56b, . . . , and 56e so that a magnetic field generated by adjacent magnetic poles generates a magnetic developing brush on the surface of the developing roller 51. The sleeve 57 transports the developer by its rotation.

A developing bias voltage (i.e. DC superimposed AC voltage) is applied onto the developing roller 51 by the power source 58. Charged toner particles are adhered onto the electrostatic latent image in response to an electric field formed at a developing portion adjacent the photoconductive drum 1. The polarity as the DC component of the bias voltage is set to be the same polarity of the surface potential of the photoreceptor and the magnitude of the DC component is set to an appropriate value so that developing contrast voltage (i.e. a potential between the electric potential of the exposed area of the photoconductive drum and the DC voltage) is set to be about 300 Volts.

The distance between the metering blade 55 and the developing roller 51 is set so that a height of the developing layer at the most closed portion between the photoconductive drum 1 and the developing roller 51 will be 2.5 mm before the developing roller 51 and the photoconductive drum are installed adjacent each other.

The AC component of the developing bias has a frequency of 6 KHz, a peak-to-peak Voltage (Vp-p) of 1.2 KV and a rectangular pulse form.

The developer is a mixture of toner particles having an average particle diameter of about 7 μm and magnetic particles (i.e. ferrite carrier) having an average particle diameter of about 50 μm. The toner concentration is set to 7%.

Figure 6A:
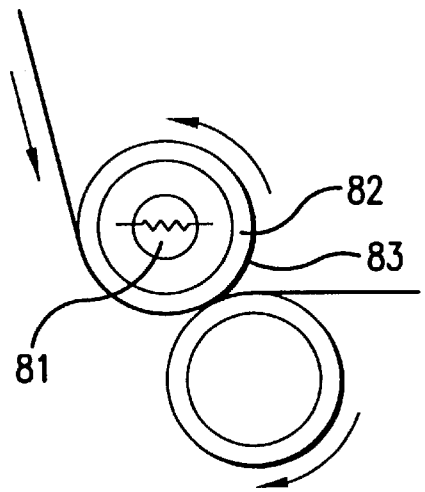
FIGS. 6(a) through (c) are schematic views of a variety structures of the heat rollers.
Figure 6B:
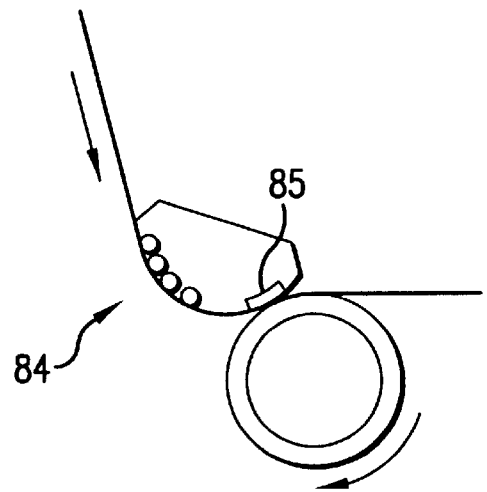
Figure 6C:
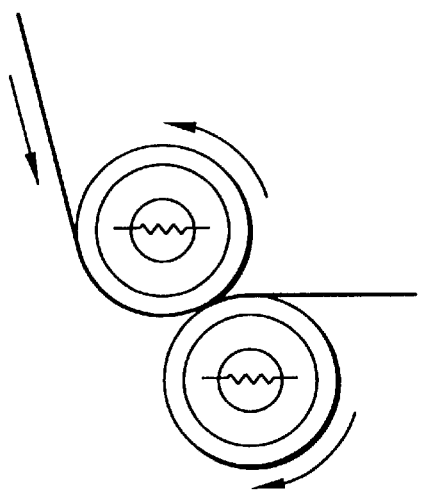

FIGS. 6(a) through (c) are schematic views of the example of the heat roller and the backup roller disclosed in FIG. 2.

The heat roller 4c used in the embodiment in FIG. 2 comprises a base roller 82 including the heating source 81 therein and an elastic layer 83 having a metal containing filler dispersed therein formed on the base roller 82. The base roller 82 has a high thermal conductivity and a rigidity capable of transporting the thermal energy generated from the heating source 81 to the elastic layer 83. The base roller 82 may be formed by metal, such as stainless alloy, aluminum or aluminum alloy. The elastic layer 83 formed on the base roller 82 has an appropriate elasticity and thickness capable of transfixing the toner image from the intermediate transfer medium 4 to the recording sheet with an appropriate pressing force and contacting nip width therebetween and high thermal conductivity capable of transferring the thermal energy from the heating source 81 to the toner image on the intermediate transfer medium 4. The elastic layer 83 is typically formed by an elastomer or an organic rubber or a synthetic resin such as fluorosilicone elastomer, silicone-carbon elastomer, silicone rubber, fluoro elastomer and ethylene-propylene-diene rubber that includes metal containing fillers.

The heat roller 4c may be heated in advance of the transfix process; however, on-demand heating devices using a low heat capacitance type heating unit, which generates heat energy upon inputting of a pulse voltage, are preferably used. A non-critical transfer voltage may be applied to the toner image by applying a voltage to the backup roller 9 while the non-fixed toner image on the intermediate transfer medium 4 is transfixed onto the recording sheet.

FIG. 6(b) discloses a low heat capacitance type heating unit that generates heat energy upon inputting of a pulse voltage. The heating unit comprises a pre-heating portion 84 including plural line heaters, a main-heating portion including plural line heaters and a surface protective layer having good slidable surface against the intermediate transfer medium formed on those heater portions. Since the heating unit has low thermal capacitance, once the pulse voltage is applied to the heating unit, it increases its temperature around 250° C. to 300° C. immediately thereafter. The heating unit may be prepared by applying a resistive material onto an alumina substrate and sintering it thereafter.

Similar to the heat roller 4c, the backup roller 9 preferably has an appropriate elasticity and thickness so as to form a suitable nip width with the heat roller 4c under a pressure therebetween. As indicated in FIG. 6(c), if necessary, additional heating elements may be installed in the backup roller 9.

Figure 7:
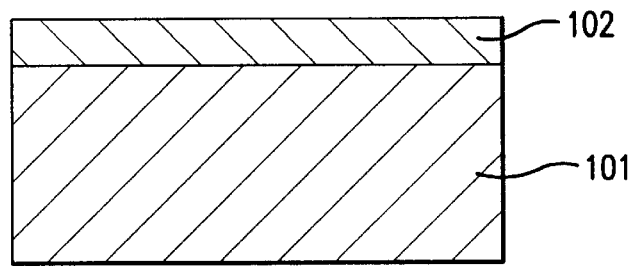
FIG. 7 is a cross sectional view of the intermediate transfer medium disclosed in FIG. 2.

FIG. 7 is a cross sectional view of the intermediate transfer medium of the embodiment disclosed in FIG. 2.

The intermediate transfer medium 4 comprises a base layer 101 and a surface layer 102. The base layer 101 may be a polyimide film having a thickness of 70 μm with carbon black particles dispersed therein. The volume resistivity of the base film is controlled by changing the total amount of the dispersed carbon black. Otherwise, the base layer 101 may be made from a high thermal resistive polymer film having a thickness of from 10 μm to 100 μm such as polyester film, polyethyleneterephthalate film, polyethersulfone film, polyetherketone film, polysulfone film, polyimide film, polyamideimide film and polyamide film.

The surface layer 102 may be a silicone copolymer of from 20 μm to 50 μm thickness. The silicone copolymer has a preferable adhering characteristic to toner particles at room temperature and a preferable releasing characteristic (i.e. relatively low surface energy) to the melted and fluidized toner particles for transferring the melted toner particles to the recording sheet efficiently. Otherwise, other resin layers having a thickness of from 1 μm to 100 μm and releasing characteristic to toner particles may be used as the surface layer 102. Such resins include tetrafluoroethylene-perfluoroalkylvinylether copolymer, polytetrafluoroethylene or the like.

Figure 8:
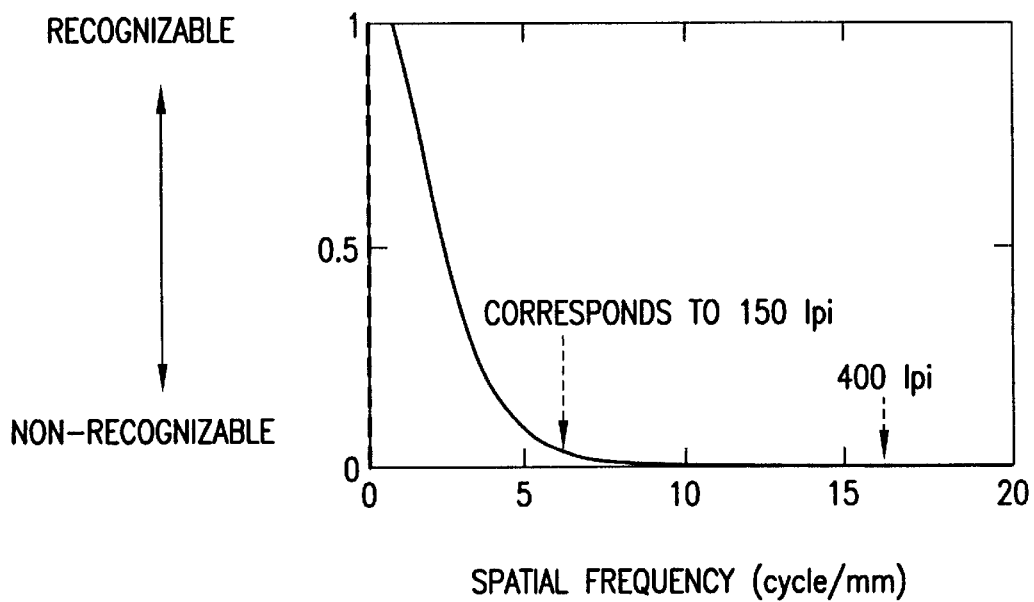
FIG. 8 is a graph showing a relationship between VTF, which is a recognition degree of image by human eyesight, and the spatial frequency of the reproduced image.

Structures and characteristics of the photoreceptor used for the embodiment disclosed in FIG. 2 and a relationship between the characteristics of the photoreceptor and the spot diameter of the laser beam for scanning the surface of the photoreceptor will be explained in detail hereinafter. FIG. 8 is a graph showing a relationship between a Visual Transfer Function (VTF), which indicates a degree of the image recognition of human visual type, to a spatial frequency of the image. As understand from FIG. 8, when a halftone image is reproduced by halftone dots or line screens, the reproduced image should have a resolution at least 150 lines per inch (lpi) in order to be recognized as an uniform halftone image without any recognition of the existence of the structures of halftone dots or line screens for human visual type. Therefore, it is assumed that the image reproduced by the present invention will have a resolution of at least 150 lines per inch with gradation not less than 50 levels.

Figure 9A:
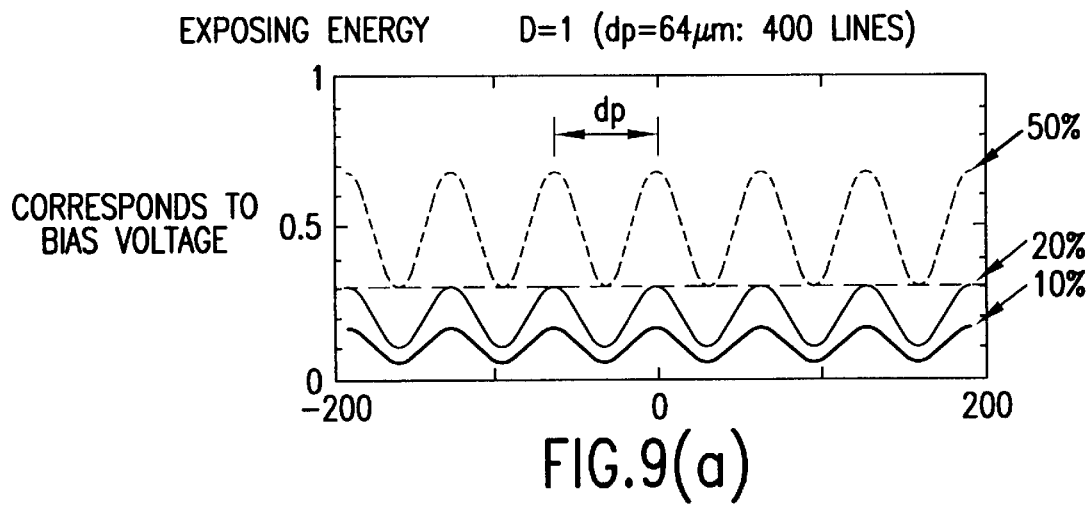
FIGS. 9(a) through (c) are graphs showing a relationship between energy profiles of the exposing light and the position of the surface of the photoreceptor.

FIGS. 9(a), (b) and (c) disclose energy profiles of the exposure light for exposing the surface of the photoreceptor when the value D is 1/1, 1/2 and 1/3, respectively, providing D is the Dbh/Dph wherein the Dbh is a spot diameter (mm) of the exposure light beam (i.e. set to a constant ) and the Dph (mm) is a distance between the adjacent pixels. In each figure, energy profiles corresponding to the exposing light of 50%, 20% and 10% turned-on pulse width to the Dph are indicated. In those figures, a boundary line corresponding to the DC bias voltage that is applied to the developing roller 51 during the developing process of the present embodiment in FIG. 2 is also indicated by dotted straight lines.

Figure 9B:
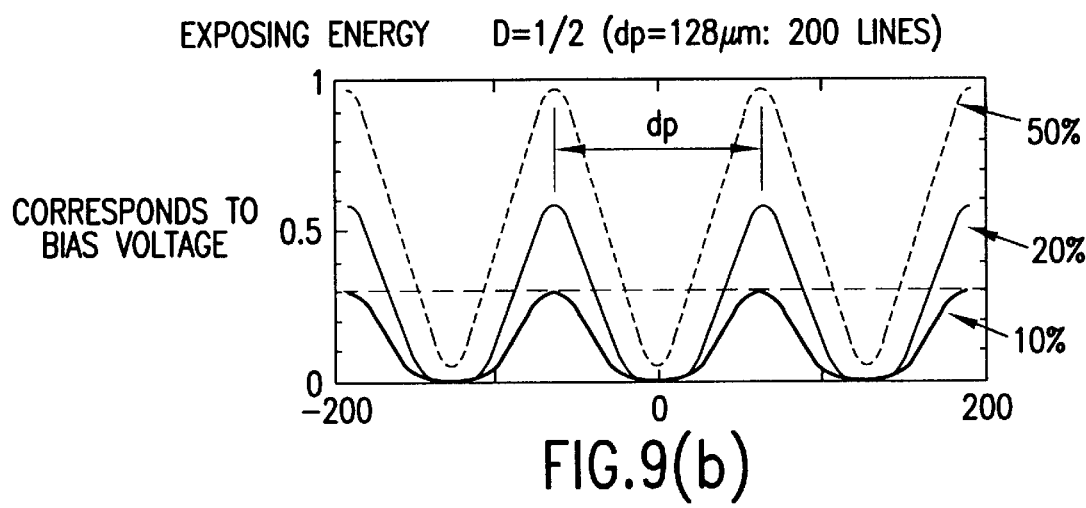
Figure 9C:
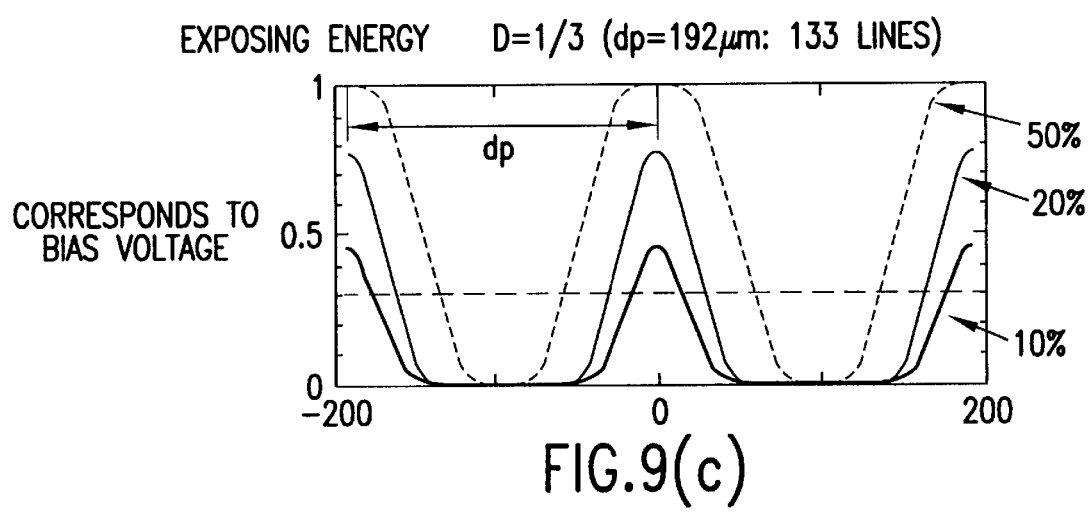
Figure 10A:
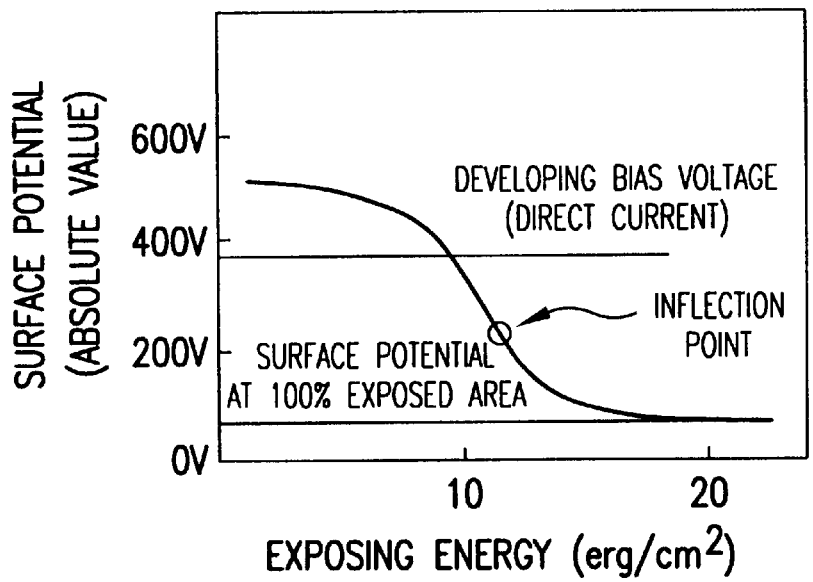
FIGS. 10(a) and (b) are graphs showing a relationship between energy profiles of the exposing light and the surface potential of the photoreceptor.
Figure 10B:
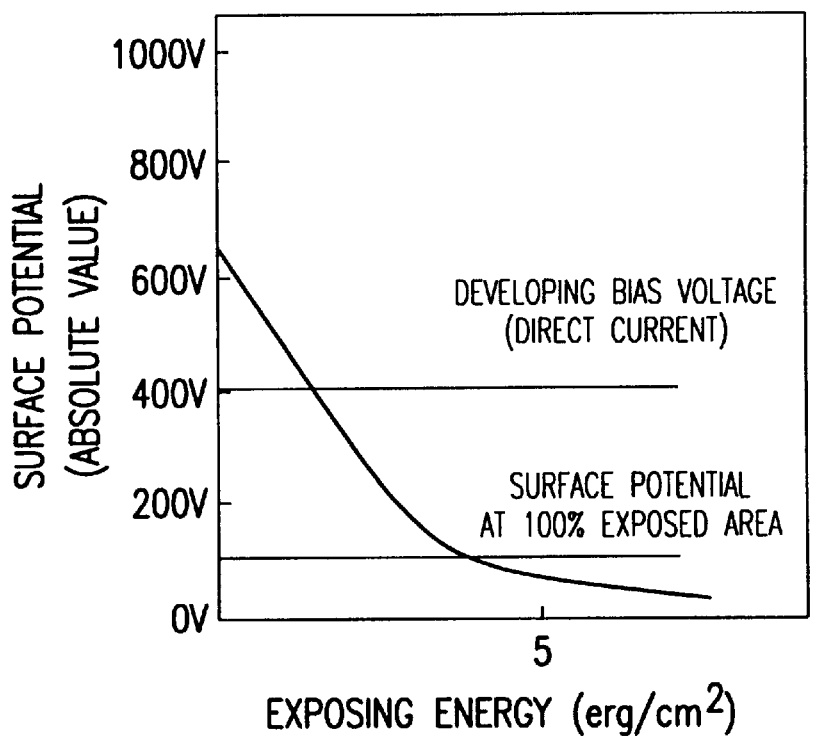

FIGS. 10(a) and (b) disclose charge decaying profiles of two kinds of photoreceptors. As clearly indicated in FIG. 9(a), when the pulse width (%) of the laser beam (i.e. corresponding to the exposed area (%) in each pixel) decreases, the contrast of the exposing light profile will decrease similar to the analogue one and not exceed the boundary corresponding to the developing bias voltage. In this case, the contrast potential in this pixel will no longer be represented as a digitized toned image. As the value of D decreases as 1/1, 1/2 and 1/3, the contrast dropping will be decreased, as understood from FIG. 9. Therefore, if the value D is minimized by decreasing the number of lines N, providing the average diameter of beam spot Dbh is maintained constant, the dot image or line image at the low density area will be reproduced finely. If the value of D is set to 1/2, the highlight image area having 10 percent exposed pixels will normally be reproduced; however, if the photoreceptor has a relatively linear charge decaying characteristic as shown in FIG. 10(b), the profile of the surface potential at the highlight image area having 10 percent exposed pixels is still similar to the analogue one, which tends to scatter developed toner particles in a pixel. Therefore, preferably, the value D is set to at least not more than 1/2, more preferably set to about 1/3 in order that the toned image has the intended image structure even in the highlight image area and the pixels of the toned image are formed by toner particles being put together in the pixel.

In the photoreceptor having a charge decaying characteristic as shown in FIG. 10(a), which means the photoreceptor has a relatively slow charge decaying profile to a relatively weak exposing light and a relatively fast charge decaying profile to an exposing light exceeding a predetermined strength, if the value of D is about 1/2, the dots or lines of the highlight image area having 10 percent exposed area begin to be reproduced finely and the surface potential profile is also similar to that of the digitized one. Thus, the pixels are reproduced by toner particles being put together with relatively low toner scattering.

Figure 11A:
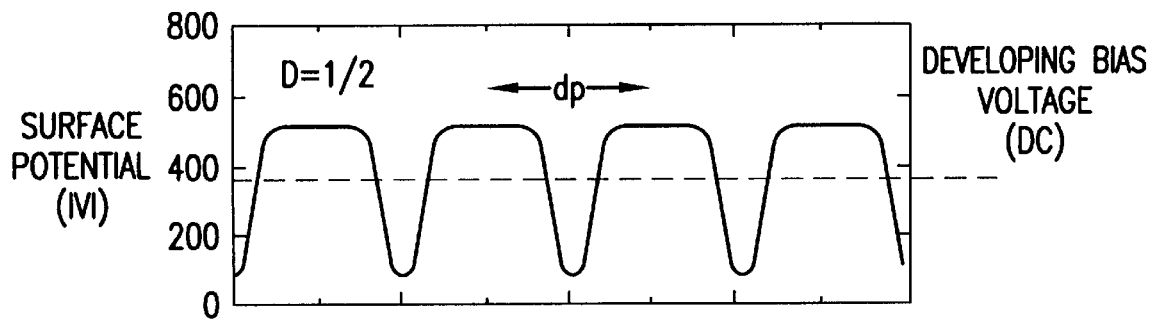
FIGS. 11(a) and (b) are simulated graphs showing relationship between the surface potential of the photoreceptor and the position on the photoreceptor.
Figure 11B:
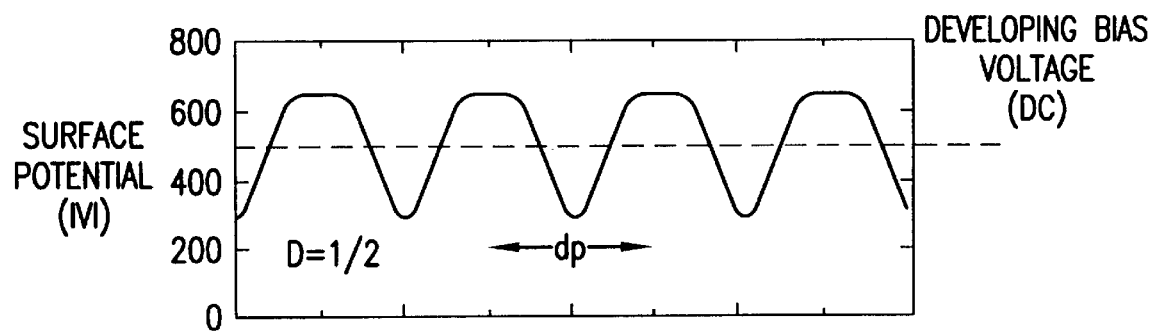

FIGS. 11(a) and (b) show simulated results of the surface potential profile on the photoreceptor when a light beam, which is modulated by an image signal corresponding to a highlight area, scans the surface of the photoreceptors each having charge decaying characteristic represented by FIG. 10(a) and (b), respectively. In this simulation, the value of D is set to 1/2. As clearly indicated in FIGS. 11(a) and (b), the profiles of the surface potential of the photoreceptors tend to be digitized ones and toner scattering on the photoreceptor is also minimized when the photoreceptor having a charge decaying profile as shown in FIG. 11(a) is used.

Then, the thus formed toner image on the photoreceptor is pressed directly on the recording sheet to be transfixed. At this moment, the toner image is transfixed at good transfixing rate since the toner image including highlight area is constituted by toner particles being put together.

Figure 12A:
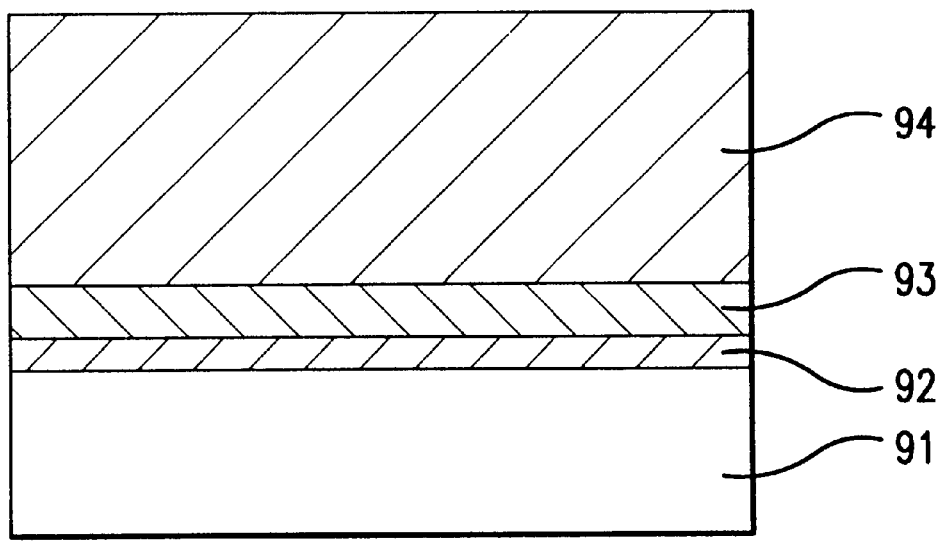
FIGS. 12(a) and (b) are cross sectional views of the photoreceptor used in an embodiment of the present invention.

FIGS. 12(a) and (b) are cross sectional views of the photoreceptors used for the present invention. By referring to FIG. 12, the structure of the photoreceptor used for the embodiment of the present invention as shown in FIG. 2 is explained hereinafter.

The photoreceptor A mentioned below has such a charge decaying characteristic indicating that relatively slow charge decay to relatively weak incident light and relatively high charge decay to an incident light exceeding a predetermined strength. In other words, the photoreceptor A has a S-curved charge decaying characteristic having an inflection point on its charge decaying curve corresponding to an inputted exposing energy. The photoreceptor B mentioned below is a typical photoreceptor using an organic semiconductor having charge decaying characteristic in proportion to an inputted exposure amount and is referred to as a function separated type photoreceptor, comprising a charge generating layer and a charge transporting layer.

The heterogeneous charge transporting layer mentioned below is composed of charge transporting domains dispersed in an electrically inert matrix and characterized as a heterogeneous system having two phases of a charge inert phase and electrically inert phase. The heterogeneous charge transporting layer may be made by dispersing a charge transporting material as a microcrystalline state (i.e. charge transporting domain) in an electrically insulating resin (i.e. electrically inert matrix).

The homogeneous charge transporting layer mentioned below is composed of a charge transporting matrix and characterized as a homogeneous system composed of only one charge transporting phase. The homogeneous charge transporting layer may be formed by a charge transporting polymer itself or formed by dissolving a charge transporting material in a molecular state into a binder resin.

Photoreceptor A

The photoreceptor A comprises a conductive support 91, a charge generating layer 92, a heterogeneous charge transporting layer 93 and a homogeneous charge transporting layer 94 as shown in FIG. 12(a). An aluminum hollow pipe is used as the conductive substrate 91. The charge generating layer 92 is a layer having a thickness of 0.5 μm and made by coating a solution, which is prepared by mixing and dispersing two parts of dichloro-tinphthalocyanine pigment as a photoconductive pigment and one part of polyvinylbutyral resin in a solvent, on the aluminum pipe.

The heterogeneous charge transporting layer 93 is a layer having a thickness of 2 μm and made by coating a solution, which is prepared by mixing and dispersing hexagonal selenium particles and vinylchloride-vinylacetate copolymer in a solvent, on the charge generating layer 92. The average volume ratio of the hexagonal selenium particles in the heterogeneous charge transporting layer is about 30 percent. The average particle diameter of the hexagonal selenium particles is about 0.05 μm.

Then the homogeneous charge transporting layer 94 having a thickness of 20 μm is formed on the heterogeneous charge transporting layer 93 by coating a solution, which is prepared by dissolving the compound having a repeating unit represented by the following general formula (I) in a solution, and drying thereof. The thus prepared photoreceptor A shows a charge decaying characteristic as indicated in FIG. 10(a).

| Table 1(a) | | Table 1(b) | |
|---|---|---|---|
| Value of D | n/m | Value of D | n/m |
| 0.4 | 0.95 | 0.4 | 0.90 |
| 0.6 | 0.85 | 0.6 | 0.72 |
| 1 | 0.74 | 1 | 0.51 |

Figure 13A:
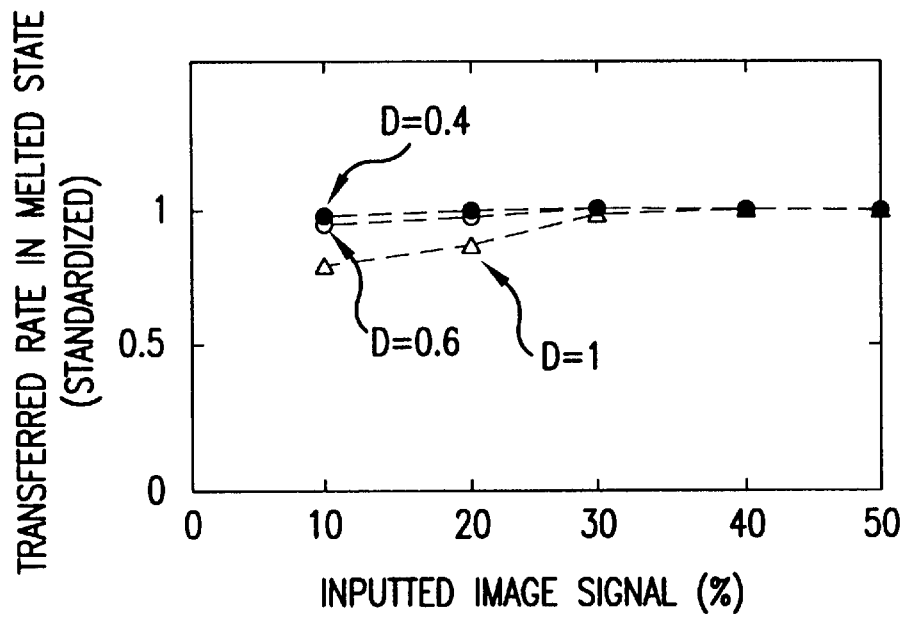
FIGS. 13(a) and (b) are graphs showing thermal transfer rate of the toner image corresponding to the rate of inputted signal.
Figure 13A:
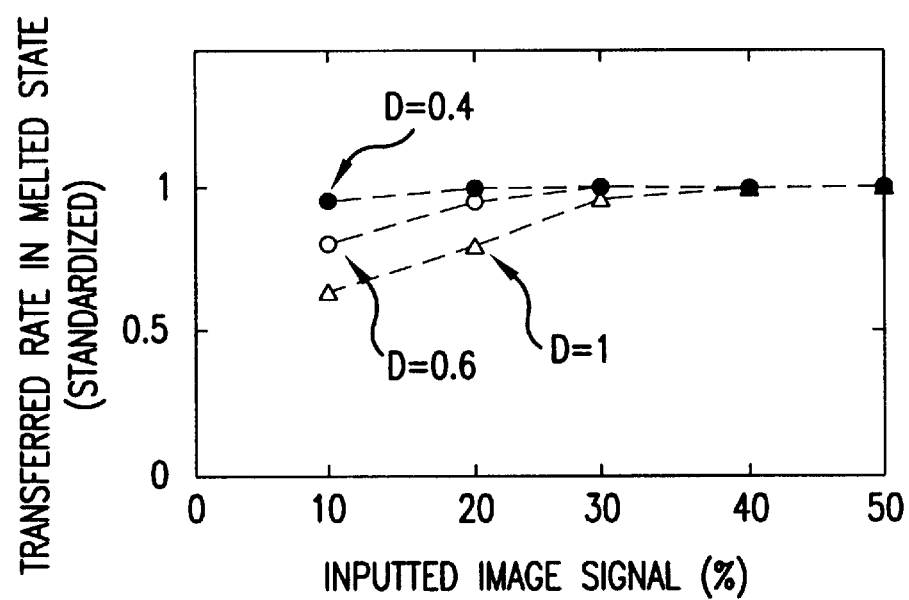

In this experiment, the quantity of heat of the heat roller 4c at the second transfer portion was set at an appropriate degree so that both no fixing marks at high density area and no fogs at background area occur. A dot screen method was used as the way of halftone reproducing. The output power of the laser beam was set to reproduce 10 percent pulse-width modulated inputting signal. In FIGS. 13(a) and (b), the horizontal axis represents pulse width of the inputting signal (%) and the vertical axis represents the standardized transfixing rate such that the value 1 means that the toner image is transfixed in 100 percent corresponding to the inputted image signal.

In the case of photoreceptor A, as clearly showed in FIG. 13(a), the reproducibility of the highlight area of the image increases in response to the diminishing of the value D. When the value D is not more than 0.6, almost 100 percent of the halftone image corresponding to 10 percent pulse width inputting signal was transfixed. At this time, each pixel of the halftone image corresponding to the 10 percent pulse width inputting signal on the photoreceptor was constituted by plural toner particles being put together.

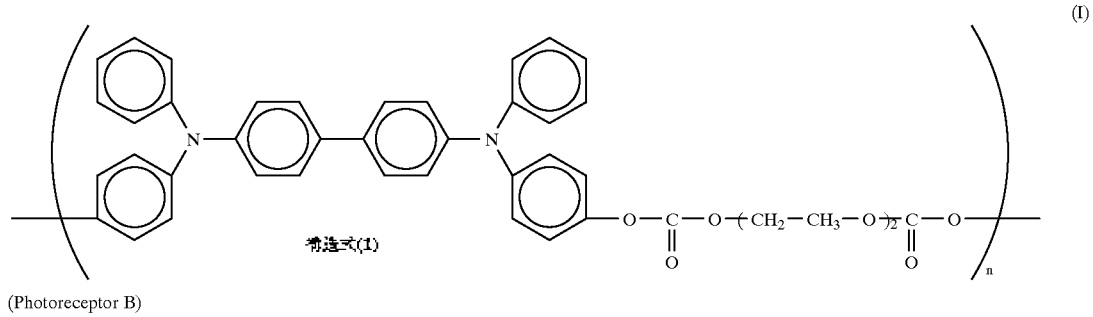

(Photoreceptor B)

Figure 12B:
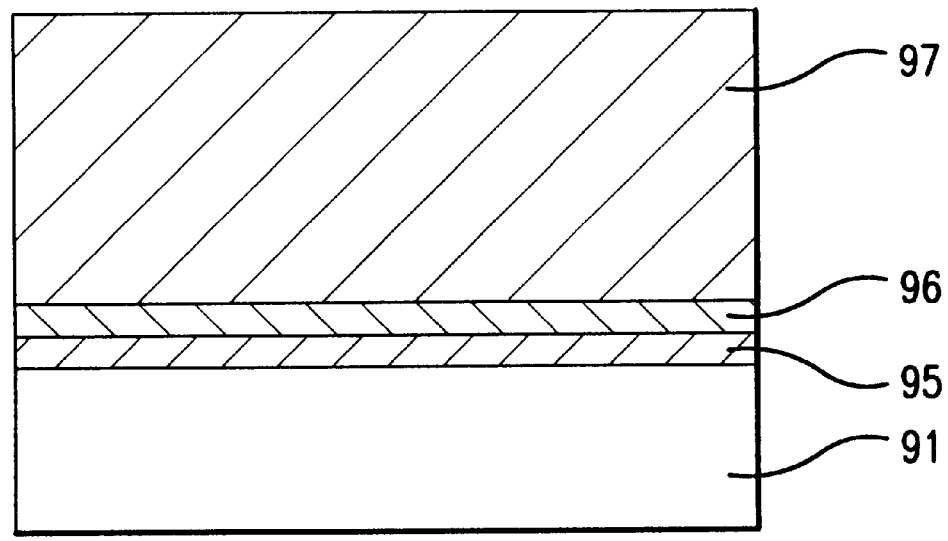

The photoreceptor B comprises a conductive support 91, an intermediate layer 95, a charge generating layer 96 and a charge transporting layer 97 as shown in FIG. 12(b). An aluminum hollow pipe is used as the conductive support 91. Methoxymethylol nylon resin having a thickness of 0.2 μm is used as the intermediate layer 95. The charge generating layer 96 is the same layer as the charge generating layer 92 of the photoreceptor A, except that a hydroxygallium phthalocyanine pigment is used instead of the dichlorotin-phthalocyanine pigment. The charge transporting layer is the same as the homogeneous charge transporting layer 94 of the photoreceptor A. The photoreceptor B shows a charge decaying characteristic as indicated in FIG. 10(b).

FIGS. 13(a) and (b) show transfixing rates of the toner particles when a halftone image is formed on the respective photoreceptors A and B by varying the value D. The tables 1(a) and (b) below also indicate values n/m as defined in FIG. 1 corresponding to FIGS. 13(a) and (b), respectively.

In the case of photoreceptor B, as clearly showed in FIG. 13(b), the reproducibility of the highlight area of the image increases in response to the diminishing of the value D. When the value D is not more than 0.4, almost 100 percent of the halftone image corresponding to 10 percent pulse width inputting signal was transfixed. At this time, each pixel of the halftone image corresponding to the 10 percent pulse width inputting signal on the photoreceptor was constituted by plural toner particles being put together. When D is 1, each pixel of the halftone image corresponding to 10 percent pulse width inputting signal on the photoreceptor was constituted by plural toner particles scattered from each other.

The evaluated results of the transferred image at the first transfer portion on the intermediate transfer medium (i.e. transferred image from the surface of the photoreceptor) are disclosed in table 2 when the surface resistivity of the silicone copolymer, which constitutes the surface layer of the intermediate transfer medium, is changed by varying the amount of the carbon black particles in the copolymer from 1 weight percent to 15 weight percent. In this evaluation, the D was set to 0.4 and the image quality of the transferred images was evaluated using halftone images corresponding to 30 percent pulse width inputting signal.

TABLE 2

| Sample No. of Intermediate transfer medium | Amount of the carbon Black (wt %) | Thickness of the surface layer (μm) | Surface resistivity of the surface layer (Ω/Square) | Photoreceptor | Evaluation result of the Toner image | value of n/m |
| --- | --- | --- | --- | --- | --- | --- |
| A | 0 | 20 | $3.5 \times 10^{17}$ | A | T* | 0.92 |
| B | 3 | 20 | $6.1 \times 10^{15}$ | A | T | 0.90 |
| C | 8 | 20 | $4.4 \times 10^{11}$ | A | T | 0.88 |
| D | 10 | 20 | $7.9 \times 10^{8}$ | A | T | 0.81 |
| E | 15 | 20 | $2.1 \times 10^{6}$ | A | S** | 0.68 |
| F | 2 | 50 | $8.2 \times 10^{15}$ | B | T | 0.90 |
| G | 5 | 50 | $3.4 \times 10^{13}$ | B | T | 0.87 |
| H | 9 | 50 | $1.5 \times 10^{9}$ | B | T | 0.90 |

*Each pixel of the transferred image was constituted by plural toner particles being put together
**Each pixel of the transferred image was constituted by plural toner particles being scattered from each other
A polyimide film having 70 μm thickness, $3.1 \times 10^{12}$ volume resistivity and carbon black dispersed therein was used as the base layer.

As shown in table 2, if the surface resistivity of the intermediate layer is less than $10^6$ Ω/Square, the electric charge on the surface of the intermediate transfer medium leaks therefrom in a lateral direction during the image transferring operation so as to scatter the toner image rather than to put the toner particles together.

The evaluated results of the transferred image at the first transfer portion on the intermediate transfer medium (i.e. transferred image from the surface of the photoreceptor) are disclosed in table 3 when the volume resistivity of the base layer of the intermediate transfer medium is changed by varying the amount of the carbon black in the base layer from 3 weight percent to 25 weight percent. In this experiment, the value D was set to 0.4 and the image quality of the transferred images was evaluated using halftone images corresponding to 30 percent pulse width inputting signal.

TABLE 3

| Sample No. of intermediate transfer medium | Amount of the carbon black (wt %) | Volume resistivity of the base (Ω cm) | Evaluation result of the toner image | value of n/m |
| --- | --- | --- | --- | --- |
| I | 3 | $2.7 \times 10^{16}$ | T* | 0.95 |
| J | 5 | $5.3 \times 10^{14}$ | T | 0.91 |
| K | 12 | $3.1 \times 10^{12}$ | T | 0.90 |
| L | 20 | $8.9 \times 10^{7}$ | T | 0.82 |
| M | 25 | $1.4 \times 10^{6}$ | S** | 0.59 |

*:Each pixel of the transferred image was constituted by plural toner particles being put together
**:Each pixel of the transferred image was constituted by plural toner particles being scattered from each other
The silicone copolymer having a thickness of 20 μm and volume resistivity of $6.1 \times 10^{15}$ was used as the surface layer and the thickness of the base layer was set to 70 μm.

As shown in table 3, if the volume resistivity of the intermediate layer is less than $10^7$ Ωcm, the electric charge on the surface of the intermediate transfer medium leaks therefrom in a lateral direction during the image transferring operation so as to scatter the toner image rather than to put the toner particles together.

The evaluated results of the transfixed toner image at the second transfer portion (i.e. transferring process followed by the first transferring process) are disclosed in table 4 using the same intermediate transfer mediums A, B, C, D, E, F, G, H, I, J, K and L that are disclosed in Tables 2 and 3. The conditions for forming the transferred image at the first transfer portion were set to the same as those of the above experiments disclosed in Tables 2 and 3. The Image qualities of the transfixed toner images were evaluated by using halftone toner images corresponding to a 30 percent pulse width image signal. The quantity of heat applied to the heat roller was set so that no fixing marks occur at the high image density area and no background fog occurs.

As shown in Table 4, when either the surface resistivity of the surface layer of the intermediate transfer medium exceeds $10^{16}$ Ω/Square or the volume resistivity of the base layer of the intermediate transfer medium exceeds $10^{15}$ Ωcm, although the transferring of the toner image from the photoreceptor to the intermediate transfer medium is possible, the toner images tend to be scattered before the transfixing since electric charge applied by the transferring charger is kept so as to cause electric spark or electric discharge near the second transferring portion.

TABLE 4

| Sample number of Intermediate Transfer Medium | Evaluation result of the toner image |
| --- | --- |
| A | S* |
| B | T** |
| C | T |
| D | T |
| E | T |
| F | T |
| G | T |
| H | T |
| I | S |
| J | T |
| K | T |
| L | T |

*:Each pixel of the transferred image was constituted by plural toner particles being put together
**:Each pixel of the transferred image was constituted by plural toner particles being scattered from each other According to the results of the evaluations of the transferred toner images, the surface layer of the intermediate transfer medium preferably has a surface resistivity of from $10^8$ to $10^{16}$ Ω/Square and the base layer of the intermediate transfer medium preferably has a volume resistivity from $10^7$ to $10^{15}$ Ωcm.

The same experiment as the first embodiment is conducted except that the beam scanning portion 20 is replaced with an LED image bar using an LED array by varying the value of D on the photoreceptor A for evaluating transfixing rate of the toner image corresponding to inputted image signal. The transfixed rate of the toner image corresponding to the 10% pulse-width inputting image signal was determined to be almost 100 percent when the value of n/m was 0.83. On the other hand, the transfixed rate of the toner image corresponding to the 10% pulse-width inputting image signal was determined to be only 70 percent when the value of n/m was 0.68.

Figure 14:
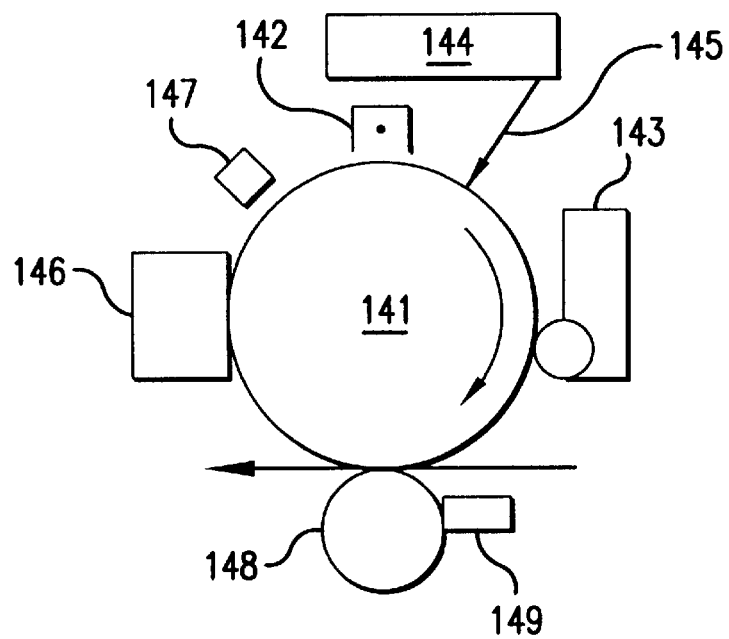
FIG. 14 is a schematic view of the second embodiment of the image forming apparatus of the present invention.

FIG. 14 shows a second embodiment of the image forming apparatus of the present invention. The image forming apparatus includes an amorphous silicone photoconductive drum 14. The apparatus further comprises a charger 142, an image scanning portion 144, a dry-type developing apparatus 143, a pressure-type transfer roller 148, a cleaner 146 and an erase lamp 147 each arranged around the photoconductive drum 141. The cleaning blade 149 is mounted so as to clean the surface of the pressure-type transfer drum.

The photoconductive drum 141 is rotated to the arrow direction by a driving power source (not shown). Primarily, the surface of the photoconductive drum is charged uniformly by the charger 142. Then the charged surface of the photoconductive drum 141 is exposed by light beam 145, which is emitted by the image scanning portion 141 and corresponds to digitized image data, for forming an electrostatic latent image.

The electrostatic latent image on the photoreceptor is then developed by a developer of the dry-type developing apparatus 143 for forming a toner image. Although the amorphous silicone photoconductive drum is used as an electrostatic image carrying member in this embodiment, this member may be replaced by any other photoconductive drum or belt that is suitable for an image transfer process using pressure force.

Toner material having a characteristic such as relatively high electric resistivity, chargeability and capability for electrostatic development using electrostatic charge induced by an electric field may be used for the present embodiment. Although there are no critical limitations for the toner particles, encapsulated toner particles are preferably used in this embodiment. The encapsulated toner particle comprises a core material and a shell material encapsulating the core material. The core material typically comprises a binder resin, solvent dissolving the binder resin (i.e. preferably a high boiling point solvent) and coloring material. Preferably, such materials may be a mixture of soft solid material and a magnetic particle as the coloring material. The shell material may be formed by polyurethane resin, polyamide resin, polyester resin, epoxy resin, epoxyurea resin or epoxyurethane resin; however, polyurea resin is preferably used. The dry-type developing apparatus 143 may be any of the various kinds of developing apparatus using any known developing process for ordinary electrophotographic process; however, in this embodiment, a magnetic-type one component developing apparatus comprising a magnet roller and a one component magnetic toner is preferably used.

The toner image formed on the photoconductive drum 141 is transfixed onto the recording paper at the transfixed position defined as the nip portion between the photoconductive drum 141 and the pressure-type transfer roller 148. At this nip portion, 200 kgw pressure is applied for the transfixing of the toner image.

The transfixed rate of several toner images was evaluated by varying the value of D (i.e. the transfixing rate 1 means that the toner image is transfixed 100% corresponding to the inputted image signal). Highlight image area is reproduced satisfactorily according to the diminishing of the value D and the toner image corresponding to the 10% pulse width signal is transfixed at a rate of almost 100 percent when the value of D is not more than 0.4. At this time, the value of n/m was determined to be 0.85. Each pixel of the halftone image corresponding to the 10% pulse-width image signal was constituted by plural toner particles being put together, as in FIG. 1(b).

The toner image corresponding to the 10% pulse-width image signal was transfixed only 30% when the value of D was 1. At this time, the value of n/m was determined to be 0.65. Each pixel of the halftone image corresponding to the 10% pulse-width image signal was constituted by plural toner particles being scattered from each other, as in FIG. 1(d).

Figure 15:
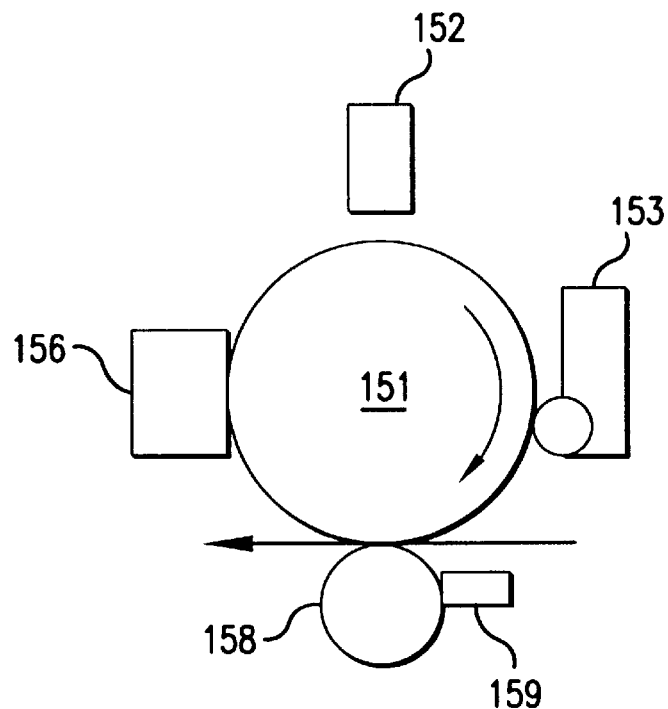
FIG. 15 is a schematic view of the third embodiment of the image forming apparatus of the present invention.

FIG. 15 shows a third embodiment of the image recording apparatus of the present invention. The image recording apparatus includes a dielectric imaging drum 151 having a dielectric layer formed on a conductive support member. An electrostatic latent image is formed on the surface of the dielectric imaging drum 151 by ion generating head 152. The ion generating head 152 comprises a charge generating source utilizing corona discharge or creeping discharge phenomena and a slit-like electric field applying means. An appropriate bias potential or ground potential is applied onto the conductive support member of the dielectric imaging drum 151. The electric charge generated by the charge generating source is transferred onto the surface of the dielectric imaging drum 151 according to an electric filed corresponding to an image signal and formed between the electric field applying means and the dielectric imaging drum.

The dielectric imaging drum 151 is rotated in the arrow direction and the electrostatic latent image formed on the surface of the dielectric imaging drum 151 is then developed by a developer supplied by the dry-type developing apparatus 153 for forming a toner image. The toner image on the dielectric imaging drum 151 is transfixed onto the surface of the recording sheet by pressing the recording sheet at the nip between the dielectric imaging drum 151 and the press-type transfer drum 158, similar to that of the second embodiment. The characteristics or conditions of the developing apparatus, developer and the press-type transfer roller are the same as those of the second embodiment.

In this embodiment, the equivalent condition corresponding to the value D of the first or second embodiment is varied by controlling the amount of the electric charge generated by the ion generating head and by controlling the size of the basic pixel unit. The transfixed rates of the several toner images were evaluated (i.e. the transfixing rate 1 means that the toner image is transfixed 100% corresponding to the inputted image signal). The toner image corresponding to the 10% pulse width signal was transfixed at a rate of almost 100% when the n/m was 0.85 and was transfixed at a rate only 75% when the n/m was 0.71, respectively.

Figure 16:
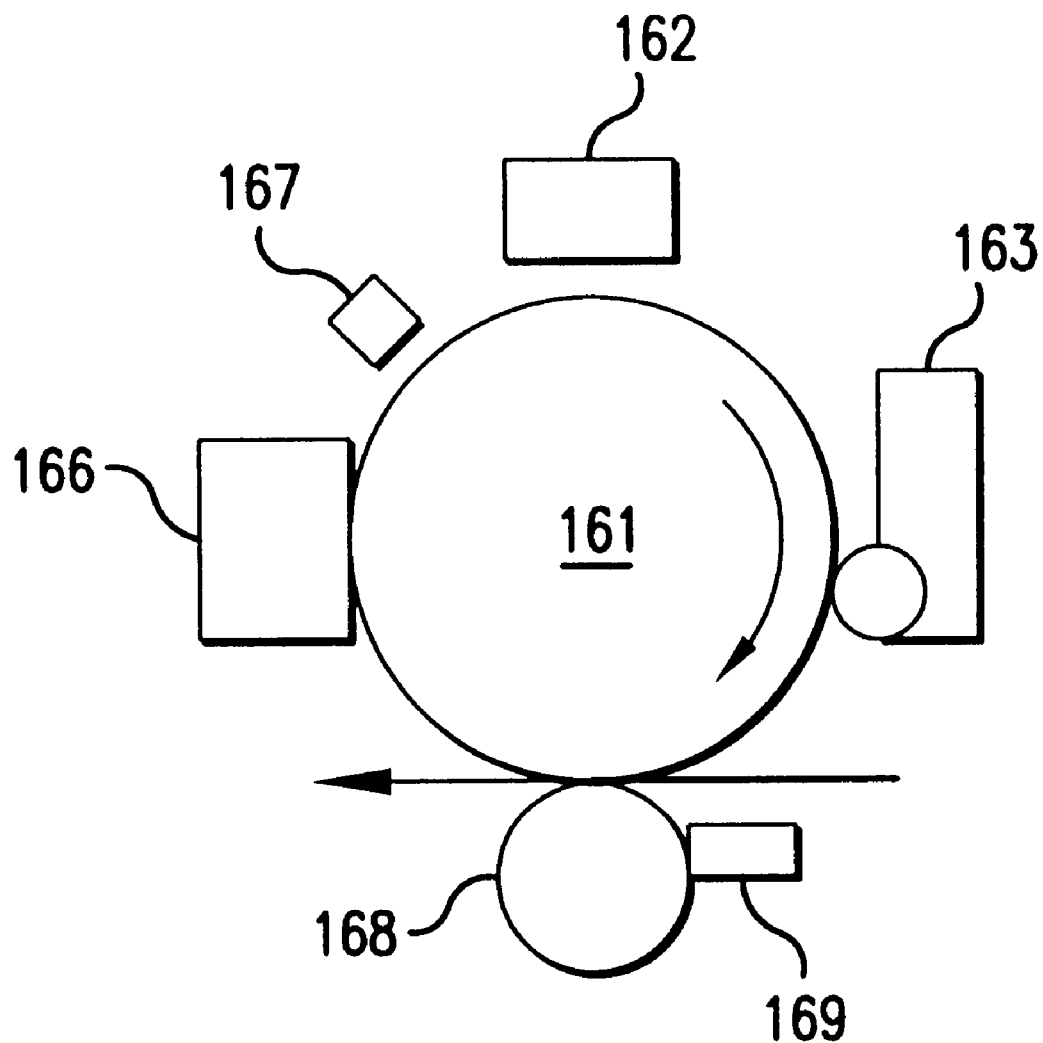
FIG. 16 is a schematic view of the third embodiment of the image forming apparatus of the present invention.

FIG. 16 shows a fourth embodiment of the image forming apparatus of the present invention. This apparatus utilizes the magnetography process described below. The apparatus comprises a magnetic imaging drum 161 having a magnetic layer thereon. The magnetic layer is similar to that of ordinary magnetic tapes. For example, the magnetic layer may be made by dispersing ferromagnetic particles such as magnetite or ferrite in a binder resin and applying it on a surface of the supporting member or by forming a magnetic metal layer on a surface of the supporting member by using a vapor deposition method, sputtering method or metal plating method. A magnetic latent image is formed on the magnetic layer of the magnetic imaging drum 161 by using the magnetic imaging head 162 corresponding to an image signal. Several types of magnetic imaging heads, for example magnetizing type for portionally magnetizing the magnetic layer by applying a strong magnetic flux that is induced by an electric current applied to a coil member, or portionally demagnetizing or portionally reversing type for changing the magnetic status of the uniformly magnetized magnetic layer by using a heater element or laser beam, may be used in this embodiment; however, the abovementioned magnetizing type is preferably used in this embodiment.

The magnetic imaging drum 161 is rotated in the arrow direction and the magnetic latent image is developed by applying magnetic toner particles through the magnetic developing apparatus 163 for forming a toner image. The magnetic developing apparatus 163 may be a type that the magnetic toner is maintained on a surface of a rotating magnetic sleeve for forming a magnetic brush thereon and contacting the magnetic toner to the surface of the magnetic drum 161 or placing the magnetic toner adjacent to the surface of the magnetic drum 161.

The developed toner image is retained on the surface of the magnetic drum 161 by a magnetic force. The toner image is transfixed on a recording sheet at a nip portion between the magnetic drum 161 and the press-type transfer roller 168 by applying an appropriate pressure therebetween, similar to the second embodiment.

The remaining toner particles on the surface of the magnetic imaging drum 161 are removed therefrom by the cleaning apparatus 166 and the magnetic latent image on the magnetic imaging drum 161 is erased by the erasing apparatus 167 for the succeeding image forming process. If the magnetic latent image on the surface of the magnetic imaging drum is required to be erased in advance, the position of the cleaning apparatus 166 and the position of the erasing apparatus 167 may be switched with respect to the position disclosed in FIG. 16.

In this embodiment, the equivalent condition corresponding to the value D of the first or second embodiment is varied by controlling the amount of the magnetic force generated by the magnetic imaging head and by controlling the size of the basic pixel unit. The transfixed rates of the several toner images were evaluated (i.e. the transfixing rate 1 means that the toner image is transfixed 100% corresponding to the inputted image signal). The toner image corresponding to the 10% pulse width signal was transfixed at a rate of almost 100% when the n/m was 0.84 and was transfixed at a rate of only 70% when the n/m was 0.66, respectively.

Figure 17A:
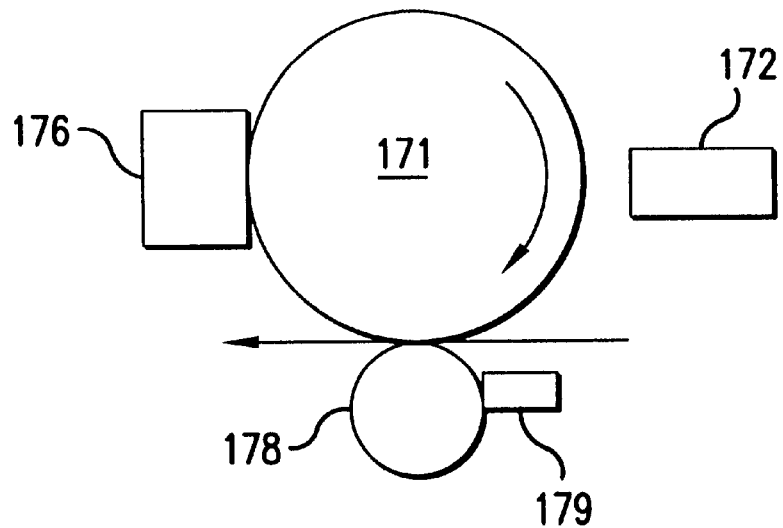
FIGS. 17(a) and (b) are schematic views of the fourth embodiment of the image forming apparatus of the present invention.

FIGS. 17(a) and (b) show a fifth embodiment of the image forming apparatus of the present invention. The apparatus utilizes a direct toner transferring method in which toner particles are transferred onto the surface of the rotating drum 171 rotating to the arrow direction corresponding to an image signal via the toner image forming apparatus 172 directly.

Figure 17B:
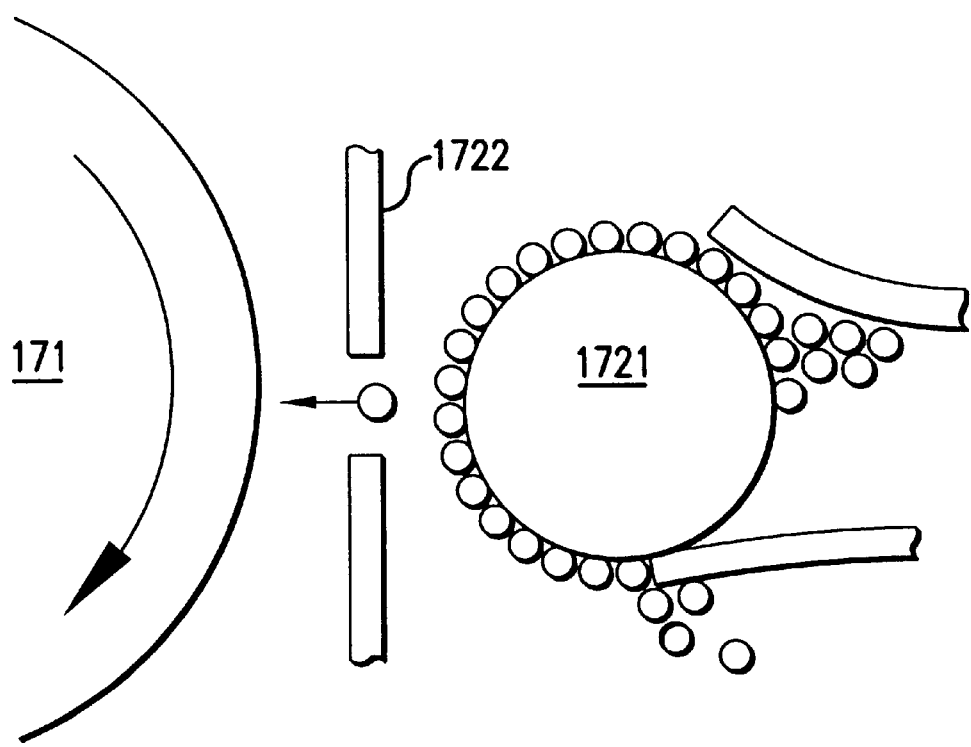

FIG. 17(b) is a schematic view of the toner image forming apparatus. The toner image forming apparatus comprises the charged toner particle supplying roller 1721 for transporting the charged toner particles to a position adjacent the rotating drum and the control electrode 1722 placed between the charged toner particle supplying roller 1721 and the rotating roller 171 for controlling an electric potential applied to the toner particles corresponding to an image signal. An appropriate bias potential or ground potential is applied to the base member of the rotating drum 171 in order to transfer the toner particles to the surface of the rotating drum 171 in response to an applied potential between the control electrode 1722 and the base member. Thus, the toner image is formed on the surface of the rotating drum 171.

The toner image is transfixed on a recording sheet at a nip portion between the rotating drum 171 and the press-type transfer roller 178 by applying an appropriate pressure therebetween, similar to the second embodiment.

In this embodiment, the equivalent condition corresponding to the value D of the first or second embodiment is varied by controlling the applied potential to the controlling electrode 1722 and by controlling the size of the basic pixel unit. The transfixed rates of the several toner images were evaluated (i.e. the transfixing rate 1 means that the toner image is transfixed 100% corresponding to the inputted image signal). The toner image corresponding to the 10% pulse width signal was transfixed at a rate of almost 100% when the n/m was 0.88 and was transfixed at a rate of only 45% when the n/m was 0.62, respectively.

As shown above, the image forming apparatus of the present invention is not limited to the image forming apparatus utilizing an electrophotographic imaging process and includes several featured image forming apparatuses utilizing several image forming methods.

What is claimed is:

1. An image forming apparatus for reproducing an image corresponding to a digitized image signal comprising:
   an imaging member;
   a halftone image forming device for reproducing a latent image composed of a plurality of pixels on the imaging member, and for developing the latent image so that coloring particles are adhered in each pixel being put together as an island, the halftone image including a relatively low density halftone image; and
   a transfixing device for simultaneously transferring the halftone image and fixing the halftone image onto a recording sheet,
   wherein a value Dbh and a value Dph satisfy the following equation:

$$Dbh/Dph \leq 0.6$$

wherein, Dph is a pitch of the pixels and Dbh is a minimum spot diameter for forming a latent image in each pixel.

2. An image forming apparatus as set forth in claim 1, wherein the coloring particles are adhered on each pixel so that a value m and a value n satisfy the following equation:

$$0.8 \leq n/m \leq 1.0$$

wherein, n is a total number of coloring particles adhered in one pixel and m is a total number of coloring particles being put together in the pixel when the halftone image is reproduced by the plural pixels, wherein in each of said pixels, the coloring particles occupy 10 percent of the pixel area.

3. An image forming apparatus as set forth in claim 1, wherein $Dbh/Dph \leq 0.4$.

4. An image forming apparatus for reproducing an image corresponding to a digitized image signal comprising:
   an imaging member comprising a photoreceptor having a surface;
   a halftone image forming device for reproducing a latent image composed of a plurality of pixels on the imaging member, and for developing the latent image so that coloring particles are adhered in each pixel being put together as an island, the halftone image including a relatively low density halftone image, said halftone image forming device comprising:
      a charger for uniformly charging the surface of the photoreceptor,
      a raster output scanner for scanning the surface of the photoreceptor by a modulated laser beam corresponding to the digitized image signal, and a developing device for developing the latent image by toner particles as the coloring particles; and a transfixing device for simultaneously transferring the halftone image and fixing the halftone image onto a recording sheet, wherein a value Dbh and a value Dph satisfy the following equation:

$$Dbh/Dph \leq 0.6$$

wherein, Dph is a pitch of the pixels and Dbh is a spot diameter of the laser beam.

5. An image forming apparatus as set forth in claim 4, wherein $Dbh/Dph \leq 0.4$.

6. An image forming apparatus as set forth in claim 5, wherein the pitch of the pixel is the pitch of the pixel in a fast scan direction of the raster output scanner.

7. An image forming apparatus as set forth in claim 4, wherein the pitch of the pixel is the pitch of the pixel in a fast scan direction of the raster output scanner.

8. An image forming apparatus as set forth in claim 4, wherein the photoreceptor has a heterogeneous charge decaying profile to an exposing energy of the laser beam favorable to relatively low exposing energy.

9. An image forming apparatus as set forth in claim 8, wherein the photoreceptor comprises a substrate and a charge generating layer and a charge transporting layer both formed on the substrate, wherein the charge transporting layer comprises a heterogeneous charge transporting layer having a charge transporting domain dispersed in an inert matrix and a homogeneous charge transporting layer having a charge transportable matrix.

* * * * *